United States Patent [19]
Passmore

[11] Patent Number: 6,000,046
[45] Date of Patent: *Dec. 7, 1999

[54] COMMON ERROR HANDLING SYSTEM

[75] Inventor: Carole J. Passmore, Colorado Springs, Colo.

[73] Assignee: Hewlett-Packard Company, Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/780,863

[22] Filed: Jan. 9, 1997

[51] Int. Cl.⁶ .................................................. G06F 11/00
[52] U.S. Cl. ................. 714/57; 714/48; 714/47
[58] Field of Search ........................... 395/185.1, 185.01, 395/185.07, 183.14, 183.21, 184.01; 714/57, 48, 54, 38, 45, 47

[56] References Cited

U.S. PATENT DOCUMENTS

| | | | |
|---|---|---|---|
| 5,119,377 | 6/1992 | Cobb et al. | 395/183.14 |
| 5,121,475 | 6/1992 | Child et al. | 707/507 |
| 5,383,178 | 1/1995 | Unverrich | 370/245 |
| 5,388,251 | 2/1995 | Makino et al. | 395/185.1 |
| 5,390,316 | 2/1995 | Cramer et al. | 395/200.31 |
| 5,673,390 | 9/1997 | Mueller | 395/185.1 |
| 5,687,313 | 11/1997 | Hirosarka et al. | 395/200.54 |

*Primary Examiner*—Dieu-Minh T. Le

[57] ABSTRACT

A system uses a common error processing process within a computer system wherein other processes that detect errors send an error message to the common process and the common process is used to display all error messages, and display the help file. The common error process detects whether the system is a distributed application running on multiple computer systems, and if this is so, the common error process sends any error messages to other computers within the distributed network, so that the error messages are displayed on all computers when one computer has an error. The system reserves an amount of memory when it is started, and keeps this memory reserved throughout operation of the system. If an out of memory error occurs in a process, the reserved memory is released, to provide sufficient memory for building an error message.

4 Claims, 5 Drawing Sheets

COMMON ERROR HANDLING SYSTEM

FIELD OF THE INVENTION

This invention relates to computer systems and more particularly to programming within such computer systems. Even more particularly, the invention relates to processing errors within a computer program.

BACKGROUND OF THE INVENTION

When developing a complex application or complex system of applications, an error handling system is needed that handles normal error conditions in the application or system and unexpected exceptions caused by the inevitable software errors made by the developer of the application or system. Complex applications or systems often create difficult error handling problems for the user of the system. The error handling must have a uniform look and equal access to the help system supplied with the application or system. Ideally, exceptions are reported through the same error handling as expected error conditions are reported. In a complex application or system, errors and exceptions may occur concurrently in different processes and if improperly handled, may cause a bewildering series of error messages to occur and, sometimes, create more exceptions in an attempt to concurrently access the error handling or help system.

One important aspect of error processing is to attempt to produce the earlier error message first within the system. That is, the first process to detect an error more often finds the actual, or root, cause of the error, and it is important that the error message displayed by this first process be the first or top most error message on the display screen connected to the computer system that displays the error. This may not occur if multiple processes detect the error, since some of those processes may have a higher priority than the process that first detected the error, and the process with the higher priority will display its message before the other processes. In this situation, the message from the process that first detects the error may be buried within the user screen and not easily visible.

Another problem that can occur is that one or more processes may consume all the memory available within the computer system. When this happens, there is insufficient user memory for the error process to display an error message. Thus, the user is uninformed and the system simply "crashes", without informing the user as to the cause of the "crash".

Another problem that can occur between applications that are distributed over more than one computer, is that the application may have a problem on a remote computer and the user at the local computer, who is actually running the process, will be unaware that an error has occurred or unaware of the cause of the error. Thus, it is important when an error occurs in a distributed system, that error messages be displayed on all computers that are operating the distributed system.

There is need in the art then for an improved system for displaying error messages in an application or system of applications. There is a further need for such a system that attempts to display the first occurring error on the most prominent portion of the computer screen attached to the process that is running. Another need is for such a system that gives equal access to a help file for all errors. Still another need is for such a system that can display out of memory error messages, even though the system has no memory available for use in constructing the error message. A still further need is for such a system that can remotely display errors in an application or system application. The present invention solves these and other needs in the art.

SUMMARY OF THE INVENTION

It is an aspect of the present invention to process errors within a common process of a computer system.

It is another aspect of the invention to detect errors within each process of the computer system and transfer the error information to a common error processing process of the computer system.

Another aspect is to provide all help information from the common error processing process within the computer system.

Another aspect of the invention is to transfer error information to a second computer system connected to the computer system.

A further aspect of the invention is to reserve memory when the system is initialized, and then release the memory in the event of a memory error, so that the released memory can be used to process the memory error.

The above and other aspects of the invention are accomplished in a system that uses a common error processing process within the computer system wherein other processes that detect errors send an error message to the common process and the common process is used to display all error messages, and display the help file. By displaying all error messages from the common process, the messages are more likely to come out in a correct order of discovery of an error, when multiple processes detect the same error.

The common error process detects whether the system is a distributed application running on multiple computer systems, and if this is so, the common error process sends any error messages to other computers within the distributed network, so that the error messages are displayed on all computers when one computer has an error. This insures that the user of the distributed application will receive the error message, regardless of which computer they are actually using to run the application.

The invention also reserves an amount of memory in each process when it is started, and keeps this memory reserved throughout operation of the system. If an out of memory error occurs in another process, the reserved memory is released, to provide sufficient memory for building an error message. This insures that an error message indicating an out of memory condition is reported to a user of the system.

BRIEF DESCRIPTION OF THE DRAWINGS

The above and other objects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
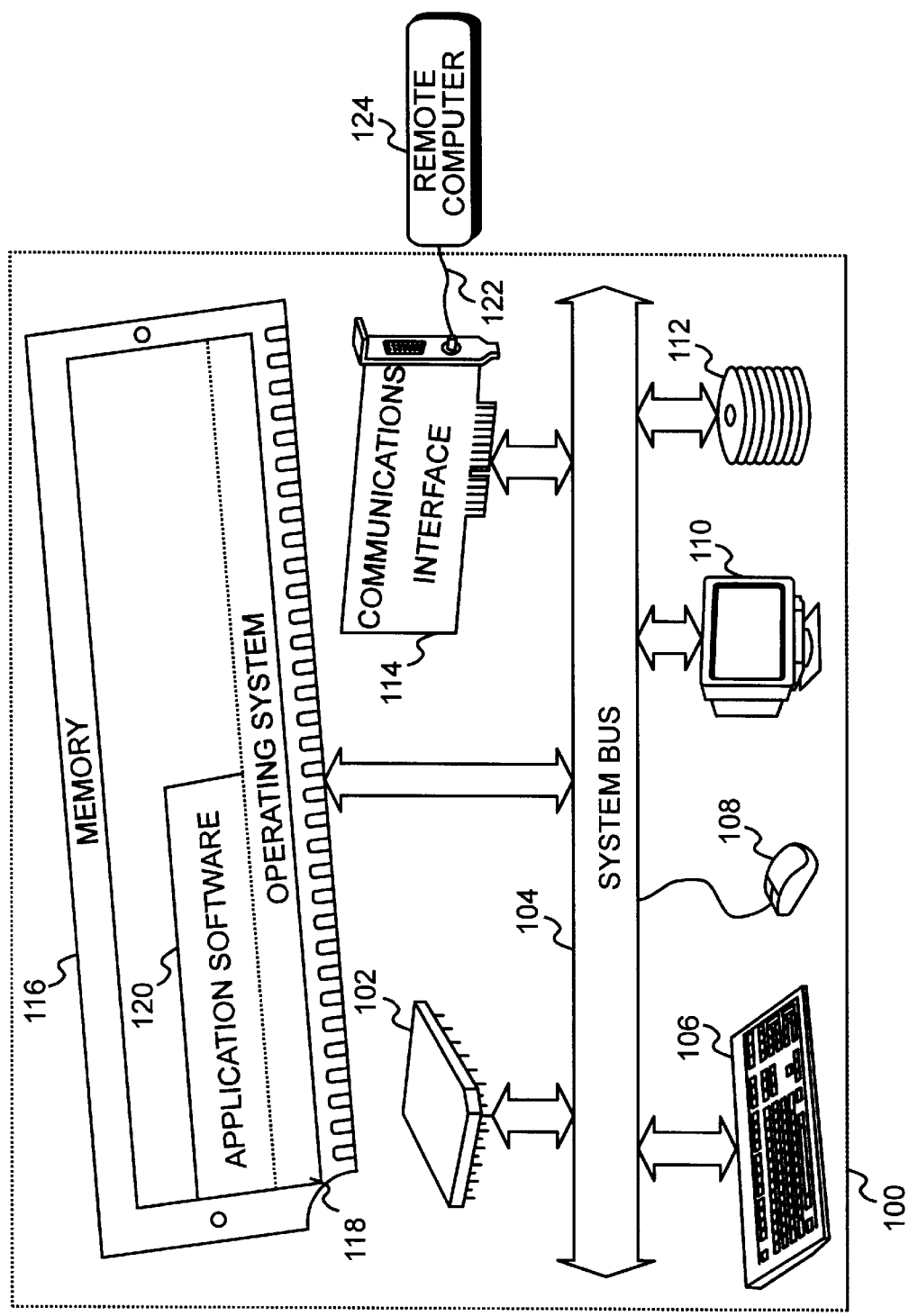
FIG. 1 shows a block diagram of a computer system incorporating the present invention.

FIG. 1 shows a block diagram of a computer system incorporating the present invention. Referring now to FIG. 1, a computer system 100 contains a processing element 102 which communicates to other elements of the computer system 100 over a system bus 104. A keyboard device 106, and a graphical user input device 108, such as a mouse, provide input to the computer system 100 while a graphics display device 110 allows software within the computer system 100 to output information to a user of the computer system 100. A disk 112 stores software and data within the computer system 100.

Also contained within the computer system 100 is a memory 116 which contains an operating system 118. The operating system 118 may be any number of commercially available operating systems, such as the Microsoft Windows operating system. The memory 116 also contains application software 120 which contains the error processing system of the present invention.

A communications interface 114 allows the computer system 100 to communicate to other systems, such as the remote computer 124 over a network 122. The network 122 may be a local area network (LAN) or a wide area telecommunications network. This communication allows the error processing system, within the application software 120, to communicate to an error processing system within the remote computer 124 to display error messages on both computer systems.

Figure 2:
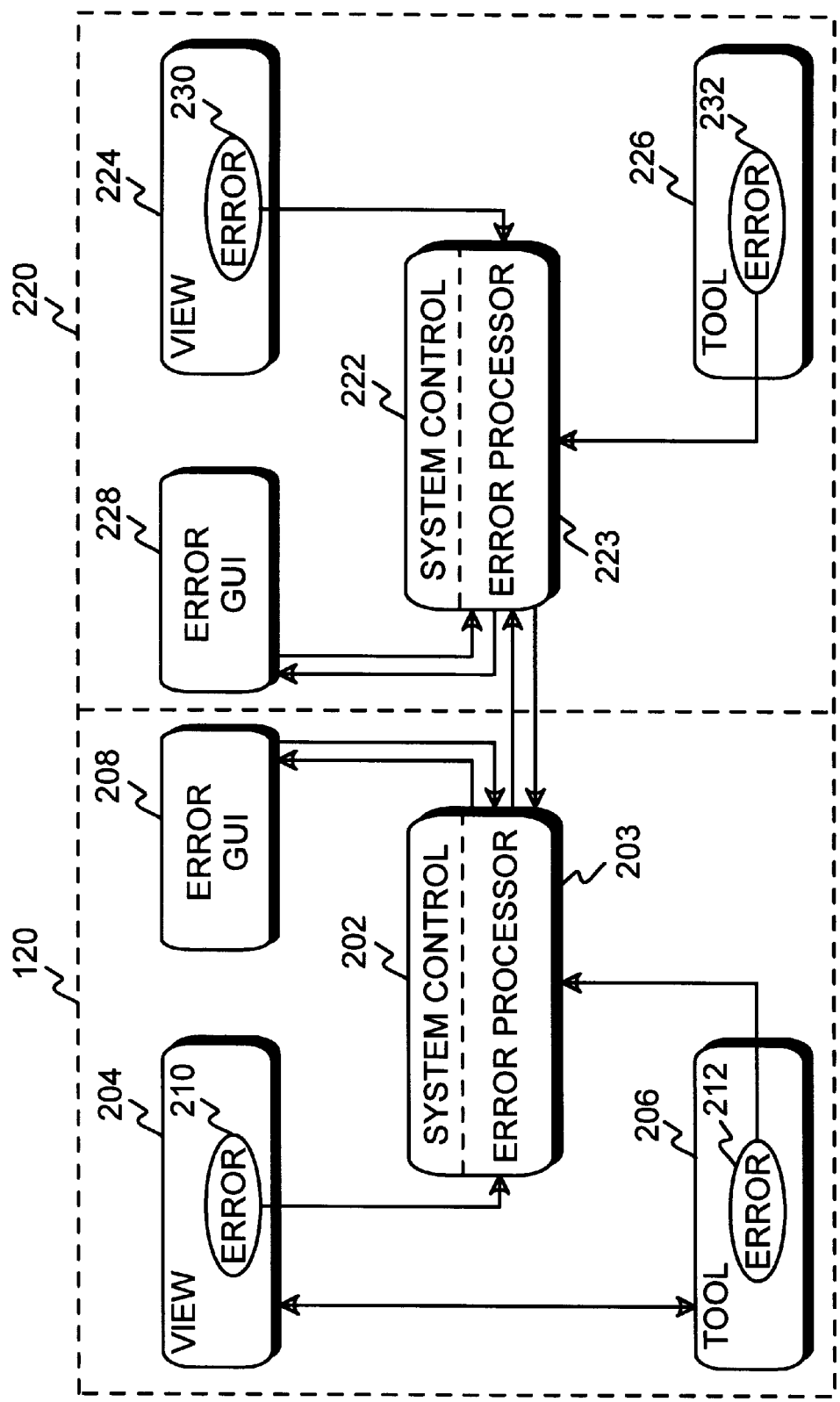
FIG. 2 shows a block diagram of the modules of the present invention.

FIG. 2 shows a block diagram of the application software 120 of FIG. 1, as well as a block diagram of an equivalent application software process running in the remote computer 124. Referring now to FIG. 2, the application software 120 contains a system control process 202 which contains an error processor 203 of the present invention. The application software 120 also contains one or more view processes 204 and one or more tool processes 206 which perform other functions within the application software. Within the view process 204 is an error process 210, of the present invention, which reports errors that occur within the view process 204. Similarly, the tool process 206 contains an error process 212 which reports errors that occur within the tool process 206.

The view process 204 typically represents an application program, as this term is commonly understood on computer systems, and the tool process 206 represents a system utility or other utility program or function used by the view process 204. Thus, either an application program, or a system tool, can report errors using the present invention.

When an error occurs, for example within the view process 204, the error process 210 of the view process 204 builds an error message and sends this error message to the error processor 203. This is typically done in the windows operating system using object linking and imbedding (OLE). Those skilled in the art will recognize, however, that the message could be sent using any type of interprocess communication mechanism within the operating system.

The error processor 203 receives the error message, formats it and sends it to an error graphical user interface (GUI) 208 for display on the graphics output device 110 (FIG. 1). A second application software process 220 represents an application software process that would run in the remote computer 124 (FIG. 1). This process has equivalents of the elements of the process 120 operating in the local computer system 100 (FIG. 1).

When an error occurs in either computer system, and that error is reported to the respective error processor within the computer system, that error processor can refer to the system to determine whether the remote computer system is attached. When the remote computer system is attached, the error processor in the computer system that detected the error asks the system to send the message over the network 122 (FIG. 1) to the error processor in the other computer system, and the error processor in the other computer system displays the error message using its error graphical user interface. Thus, for the example described above, error processor 203 would send the error message over the network 122 to error processor 223 which would display the error on its graphical user interface 228. This allows errors that occur in either computer system to be displayed on both computer systems.

Figure 3:
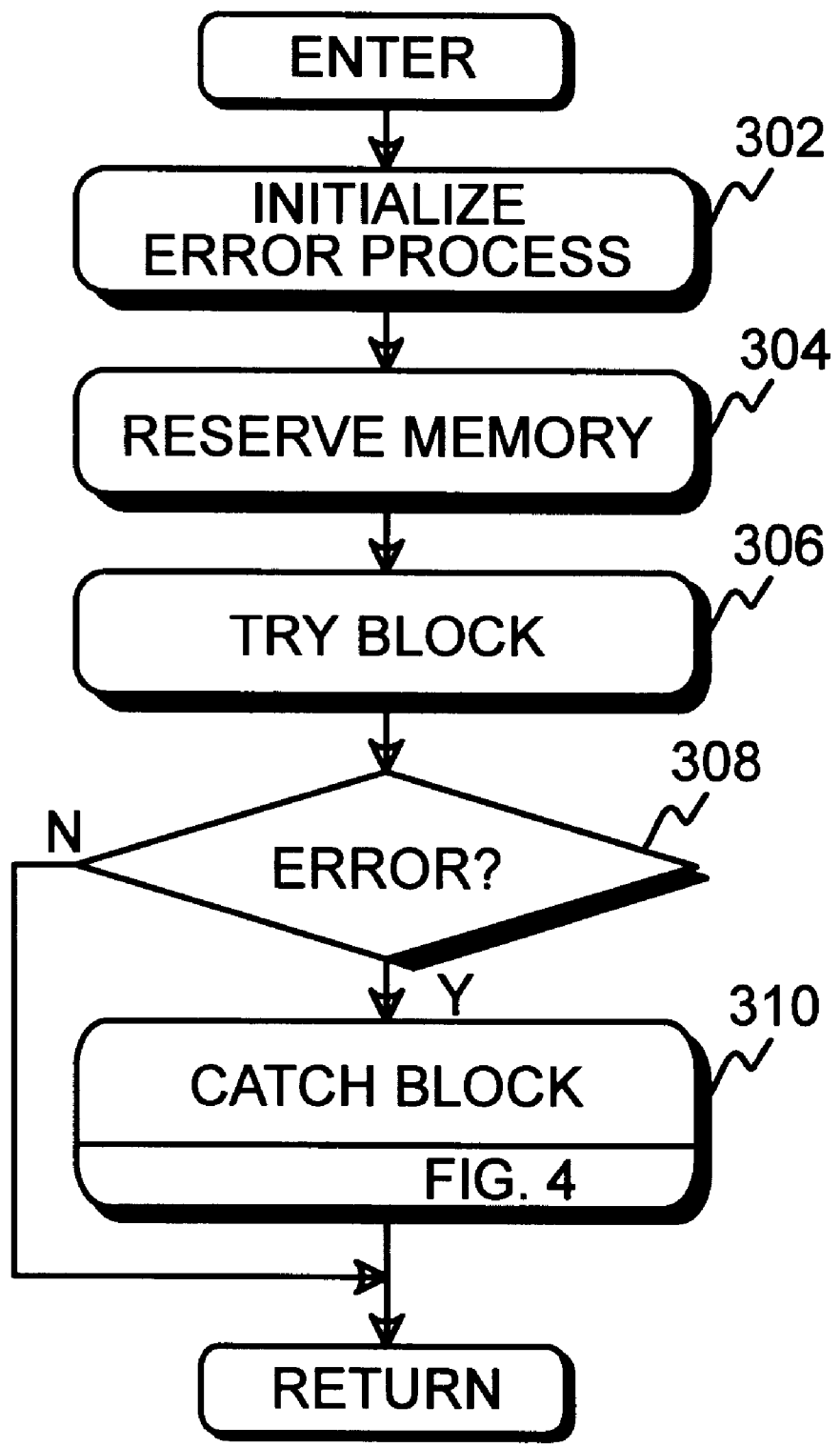
FIG. 3 shows a flowchart of the method of using the present invention.
Figure 4:
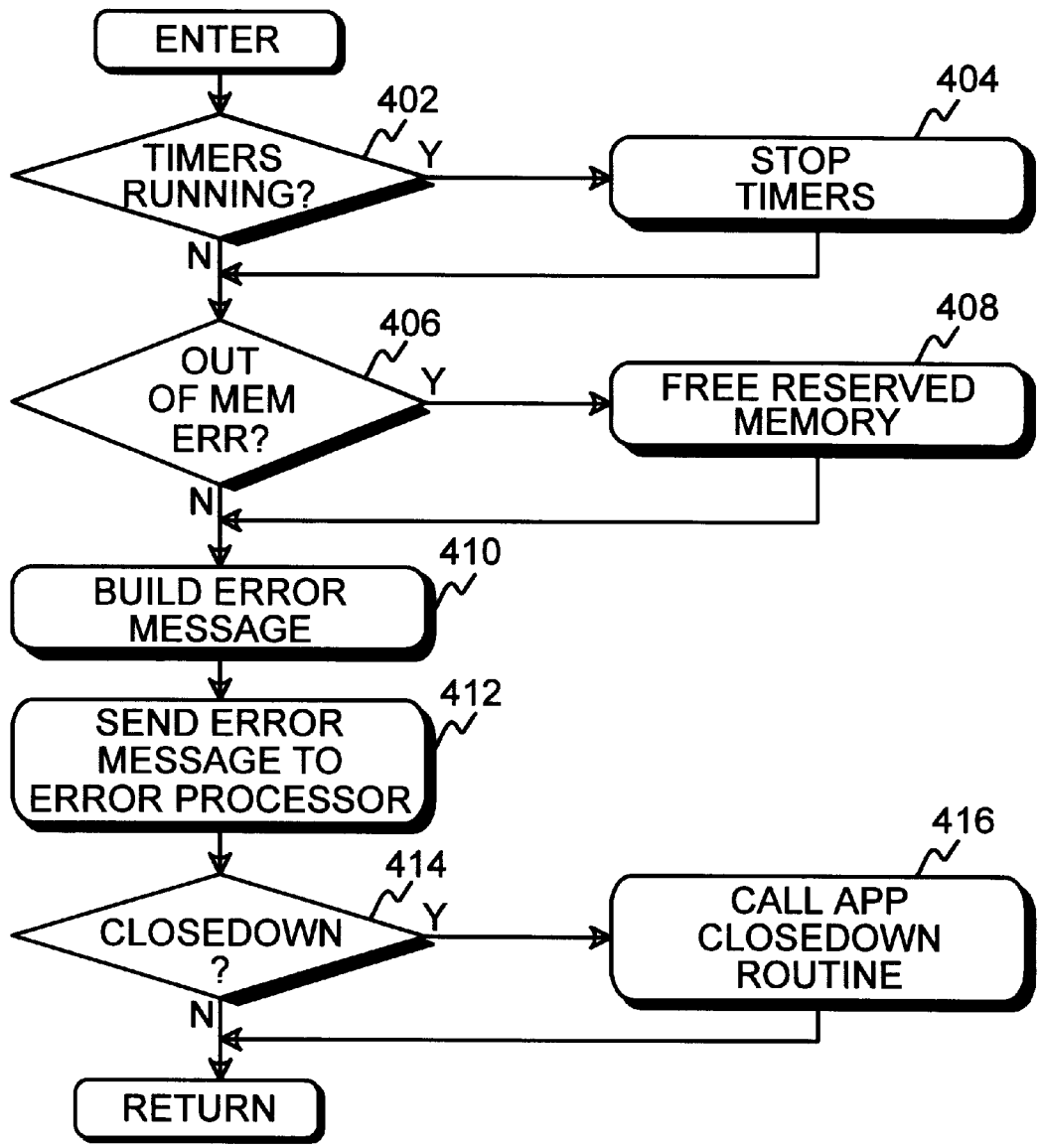
FIG. 4 shows a flowchart of the catch block called from FIG. 3.

FIGS. 3 and 4 show a flowchart of the error process 210, and the error process 212 of FIG. 2. The error process of FIGS. 3 and 4 is the same for each process in which they are performed, thus the error process of FIGS. 3 and 4 are performed within each view or tool process. Referring now to FIG. 3, when the process is started, block 302 initializes the error process. Block 304 then reserves an area of memory for use in the event of an out of memory error condition.

The present invention uses the try/catch error system available in ANSI standard C++, however, those skilled in the art will recognize that the present will work with other error detection systems. The try/catch method defined in ANSI C++ puts all the code being executed by the application, which can potentially cause an error, into a "try" block. Following each try block, is a "catch" block, which determines whether an error has occurred and takes appropriate action. The present invention uses this conventional try/catch mechanism to detect the original error.

Thus, the code of the application is performed within a try block 306. After this code is performed, block 308 determines whether an error has occurred, and if not, block 308 simply returns to the user. If an error has occurred, block 308 transfers to block 310 which calls the catch block processor of FIG. 4. Those skilled in the art will recognize that the error detection of block 308 is built into the try/catch mechanism of ANSI C++, and is not ordinarily visible to the programmer writing code that uses the try/catch mechanism.

Table 1 shows a code example of the code of FIG. 3, which uses the try/catch mechanism. In this example, the catch part of the mechanism is incorporated within a macro called "CATCH_AND_CLOSE". This macro is shown in Table 2 along with another macro that it uses. The use of macros within the mechanism is not important to the invention, and is simply a convenient way of writing the code.

FIG. 4 shows a flowchart of the catch block code called from block 310 of FIG. 3. Referring now to FIG. 4, after entry, block 402 determines whether timers are running. If timers are running, block 402 calls block 404 which stops the timers. The determination as to whether the timers are to be stopped is implemented in the present invention by choosing one of two different macros to implement the catch block. Those skilled in the art will recognize that this could also be implemented as a specific test within the catch block.

Block 406 then determines whether the error that occurred was an out of memory error. If the error was an out of memory error, block 406 goes to block 408 which frees the memory that was reserved by block 304 (FIG. 3). By freeing this memory, the present invention supplies enough memory to the operating system to allow room for building the error message, as described below.

If the error was not an out of memory error, or after freeing the reserve memory, control goes to block 410 which builds the error message for the error, and then block 412 sends this error message to the error processor 203 (FIG. 2). In the present invention, the error message is sent to the error processor using the OLE mechanism of the Microsoft Windows operating system.

After sending the error message, block 414 determines whether the catch block is to perform a close down, and if so, block 414 transfers to block 416 which calls the application close down routine. After performing the close down, or if no close down was to be performed, control returns to FIG. 3. In the present invention, the choice of whether a close down is to be performed is determined by using one of two macros to perform the catch block function in the same manner as described above with respect to the stop timers function.

Figure 5:
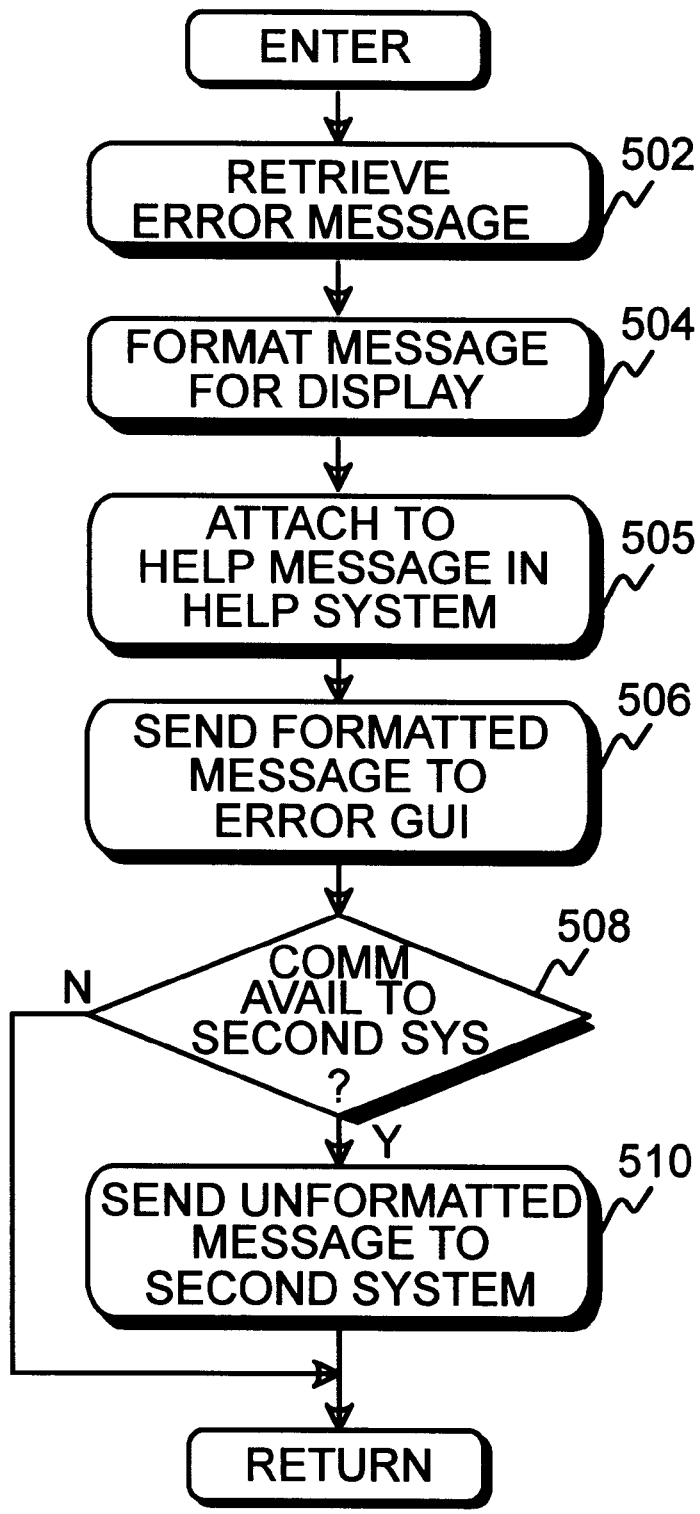
FIG. 5 shows a flowchart of the error processor of FIG. 1.

FIG. 5 shows a flowchart of the error processor 203 (FIG. 2), this is identical to the error processor 223 shown in FIG. 2. This error processor receives control when a message is sent by one of the error processes 210 or 212, as described above with respect to FIGS. 3 and 4. Referring now to FIG. 5, after entry, block 502 retrieves the error message sent by the error process 210 or 212. Block 504 then formats this error message for display to the user, block 505 finds a reference in the help system for the message and inserts it into the message, and block 506 sends the formatted message to the error GUI 208 (FIG. 2), where the message is displayed to the user. In the present invention, the error message is sent to the error processor using the OLE mechanism of the Microsoft Windows operating system.

After sending the formatted message, control goes to block 508 which determines whether communication is available to a second computer system that is performing the application software 120 (FIG. 1). If communication is available, control goes to block 510 which sends the unformatted message to the second computer system 124 (FIG. 1). The unformatted message is sent because it is smaller than the formatted message, thus saving time. After sending the unformatted message, or if no communications was available, FIG. 5 simply completes its process and returns to the operating system.

Because the error processor of the flowchart of FIG. 5 is a separate process within the computer system, and all error messages are transferred to the error processor for display, there will not be any priority conflict as to which messages are displayed first. Thus, since all error messages are displayed by the error processor, the first error message received will be displayed first, and this error message is most likely the error message produced by the process that first discovered the error condition.

Having thus described a presently preferred embodiment of the present invention, it will be understood by those skilled in the art that many changes in construction and circuitry and widely differing embodiments and applications of the invention will suggest themselves without departing from the scope of the present invention as defined in the claims. The disclosures and the description herein are intended to be illustrative and are not in any sense limiting of the invention, defined in scope by the following claims.

TABLE 1

```
{
try
    {
    //processing of the application functions
    }
    CATCH_AND_CLOSE(CerrorNumber, ProcessId)
}
```

TABLE 2

```
#define CATCH_AND_CLOSE( CerrorNumber, ProcessId ) { \
catch( CMemoryException &ce ) \
    {CleanUp () ;REPORT_MEMORY_EXCEPTION(CerrorNumber, \
ProcessId) ;Closedown () ; }
#define REPORT_MEMORY_EXCEPTION(CerrorNumber, ProcessId) \
    //send error message to Error Processor
}
```

What is claimed is:

1. A method for reporting errors from a plurality of processes of a computer system, said method comprising the steps of:
   (a) detecting an error within at least one of said plurality of processes;
   (b) building an error message within said process that detected said error;
   (c) sending said error message to an error processing process within said computer system; and
   (d) formatting and displaying said error message within said error processing process, within a single window of said computer system, wherein when more than one message is received by said error processing process, said messages are displayed in an order received.

2. A method for reporting errors from a plurality of processes of a computer system, said method comprising the steps of:
   (a) reserving a predetermined amount of memory within at least one of said plurality of processes;
   (b) detecting an error within said at least one of said plurality of processes having said memory reserved in step (a);
   (c) when said error detected in step (a) comprises an out of memory error, freeing said memory reserved in step (a);
   (d) building an error message within said process that detected said error of step (b);
   (e) sending said error message to an error processing process within said computer system; and
   (f) formatting and displaying said error message within said error processing process, wherein when more than one message is received by said error processing process, said messages are displayed in an order received.

3. A method for reporting errors from a plurality of processes of a computer system, said method comprising the steps of:
   (a) detecting an error within at least one of said plurality of processes;
   (b) building an error message within said process that detected said error;
   (c) sending said error message to an error processing process within said computer system;
   (d) formatting and displaying said error message within said error processing process, wherein when more than one message is received by said error processing process, said messages are displayed in an order received;

(e) detecting a corresponding error processing process in a second computer system connected to said computer system; and (f) sending said error message to said corresponding error processing process for display in said second computer system.

4. A method for reporting errors from a plurality of processes of a computer system, said method comprising the steps of:

(a) reserving a predetermined amount of memory within at least one of said plurality of processes;

(b) detecting an error within said at least one of said plurality of processes having said memory reserved in step (a);

(c) when said error detected in step (a) comprises an out of memory error, freeing said memory reserved in step (a);

(d) building an error message within said process that detected said error of step (b);

(e) sending said error message to an error processing process within said computer system;

(f) formatting and displaying said error message within said error processing process, within a single window of said computer system, wherein when more than one message is received by said error processing process, said messages are displayed in an order received;

(g) detecting a corresponding error processing process in a second computer system connected to said computer system; and (h) sending said error message to said corresponding error processing process for display in said second computer system.

* * * * *